United States Patent [19]

Teodorescu et al.

[11] 4,201,141
[45] May 6, 1980

[54] METHOD OF AND APPARATUS FOR INCINERATING RESIDENTIAL WASTE

[75] Inventors: Constantin Teodorescu; Radu Polizu, both of Bucharest, Romania

[73] Assignee: Institutul National Pentru Creatie Stiintifica si Tehnica-Increst, Bucharest, Romania

[21] Appl. No.: 891,196

[22] Filed: Mar. 29, 1978

[30] Foreign Application Priority Data

Apr. 18, 1977 [RO] Romania ............................ 90060

[51] Int. Cl.² ............................................. F23G 5/04
[52] U.S. Cl. ................................. 110/259; 110/227; 110/248; 110/346
[58] Field of Search ............... 110/248, 225, 226, 227, 110/228, 256, 258, 259, 346

[56] References Cited

U.S. PATENT DOCUMENTS

| | | | |
|---|---|---|---|
| 2,479,818 | 8/1949 | DeCarie | 110/225 |
| 3,330,230 | 7/1967 | Sasaki | 110/225 |
| 3,707,129 | 12/1972 | Kawashimo et al. | 110/228 |
| 3,801,082 | 4/1974 | Anderson | 110/256 |
| 3,861,332 | 1/1975 | Itasaka | 110/259 |

Primary Examiner—Edward G. Favors
Attorney, Agent, or Firm—Karl F. Ross

[57] ABSTRACT

An incinerating plant for urban refuse of low calorific value in which the refuse is fed downwardly through the vertical furnace by tilting elements staggered from side to side and through which combustion air is introduced into the material after being preheated at least in part by waste heat from exhaust gases from the furnace. The tilting elements are arms extending from a tubular support and are provided on their upper surfaces with orifices through which the air emerges.

4 Claims, 3 Drawing Figures

METHOD OF AND APPARATUS FOR INCINERATING RESIDENTIAL WASTE

Field of the Invention

The present invention relates to a process and apparatus for incinerating residential waste with a low calorific value and a high moisture content.

Background of the Invention

A known plant for incinerating residential waste with a very low calorific value and a very high poisture content is provided with a statical furnace that has a waste input feed arrangement mounted inside. This arrangement consists of a feed hopper provided at its lower part with three moving devices which are staggered and which perform successively back-and-forth movements with the help of which the waste materials are pushed forward on several incineration grates, some of which are fixed and the others mobile to perform an alternating movement in the horizontal plane.

By means of these grates the mass of waste is moved forward and dumped down until it burns out. The combustion air is drawn into the incineration chamber, both through the area beneath the grates and through the space above the grates.

The ash accumulated during the incineration process is passed through several slots cut in the grates, while the slag or residue is discharged out of the furnace after passing the last moving device. Above the grates, there is a furnace vault provided with an inner lining of refractory bricks, a vault that directs the combustion gases either to a gas outlet or to a returning gas conduit in the same direction with that of the material, thus drying the waste on the moving feed devices before combustion ensues.

A vane valve is used to control the returning gas flow.

The incineration unit mentioned above has the disadvantage that it uses a large number of moving metallic devices that have to be made of materials which present a high resistance to heat, chemical and mechanical action. Also several devices and driving motors with variable speads have to be used in order to obtain the successive movements and this often leads to operating troubles.

Summary of the Invention

The process according to the present invention obviates the aforesaid disadvantages by the fact that it uses an incinerating furnace that is vertical and static and which is provided with tilting elements which are actuated by groups of geared motors. These elements receive hot air for combustion from an air super heater recovering a quantity of the thermal energy of by the combustion gases which were cleaned by passing them through a set of centrifugal gas separators. The hot air is introduced with a predetermined speed into a bed of the waste material on the tilting elements, and in a drying chamber upstream of the incinerating furnace. From the drying chamber which is provided with a tube plate with inclined conduits the waste material is pushed down sequentially on the first tilting elements in the incinerating furnace. Here the complete drying, a process begun in the drying chamber, is readily achieved under the combined effect of the hot air blast and of the combustion gases that rise from the lower tilting elements of the incinerating furnace, the elements promote this process by the heat they radiate. The combustion process is achieved on the lowest tilting elements of the incinerating furnace. The ash and the slag, products of complete combustion, are discharged into an ash hopper, where they remain for a predetermined number of hours in order to be cooled by the injection of cool air into the lower part of the ash hopper. This air, which picks up a large quantity of the thermal energy of the ash, is utilized in order to burn any incompletely burned particles fed to the ash hopper by the set of centrifugal gas separators which clean the combustion gases before directing them to the air superheater. This air is also utilized in the combustion process that is achieved on the lowest tilting elements of the incinerating furnace. The incineration process compensates for the low calorific value of the waste both by utilizing the thermal energy contained in the hot air blown for the incinerating and the drying processes, and by recovering the waste heat from the ash and the slag collected in the ash hopper, at the base of the incinerating furnace. Thus, the incinerating process is based on the self-combustion principle eliminating the need of liquid fuel supply, and evolving only due to the recirculation of a quantity of the heat that is produced in the incinerating furnace itself, simply by maintaining the temperature of the combustion gases which leave the incinerating furnace within a range of 800° to 950° C. Thus the temperature of the combustion air could be held over 400° C., maintaining, at the same time, the required range of temperature at the upper part of the ash hopper these being temperatures which condition each other.

The plant for carrying out the above mentioned process, consists of a vertical incinerating furnace and fed with waste material through a drying chamber provided with a tube plate with inclined conduits, through which hot air is injected in the bed of waste material. The tube plate is mounted at the lower part of the drying chamber. The incinerating furnace is provided with tilting elements, which are mounted at different levels, in a vertical staggered arrangement on the furnace and are automatically actuated. The tilting elements of the furnace comprise mainly a rotating tube, bearings and packings, and a tilting member as well. The tilting member is rigidly mounted on the rotating tube, and is provided with arms, which have orifices along their upper surface through which the combustion air is injected into the bed of waste material. Before injecting it into the waste, the combustion air is passed through longitudinal slots in the tilting member and in the rotating tube, which is permanently supplied with air. At the lower part of the incinerating furnace there are a linking transom provided with an automatic burner operating with hot air, and an ash hopper. A high pressure blower and a sealing, discharge passage are mounted at the bottom of the ash hopper. The discharge passage is connected to a slime separator linked to an exhauster for drawing in the steam emanated when the ash is discharged in a water bath.

Specific Description

Figure 1:
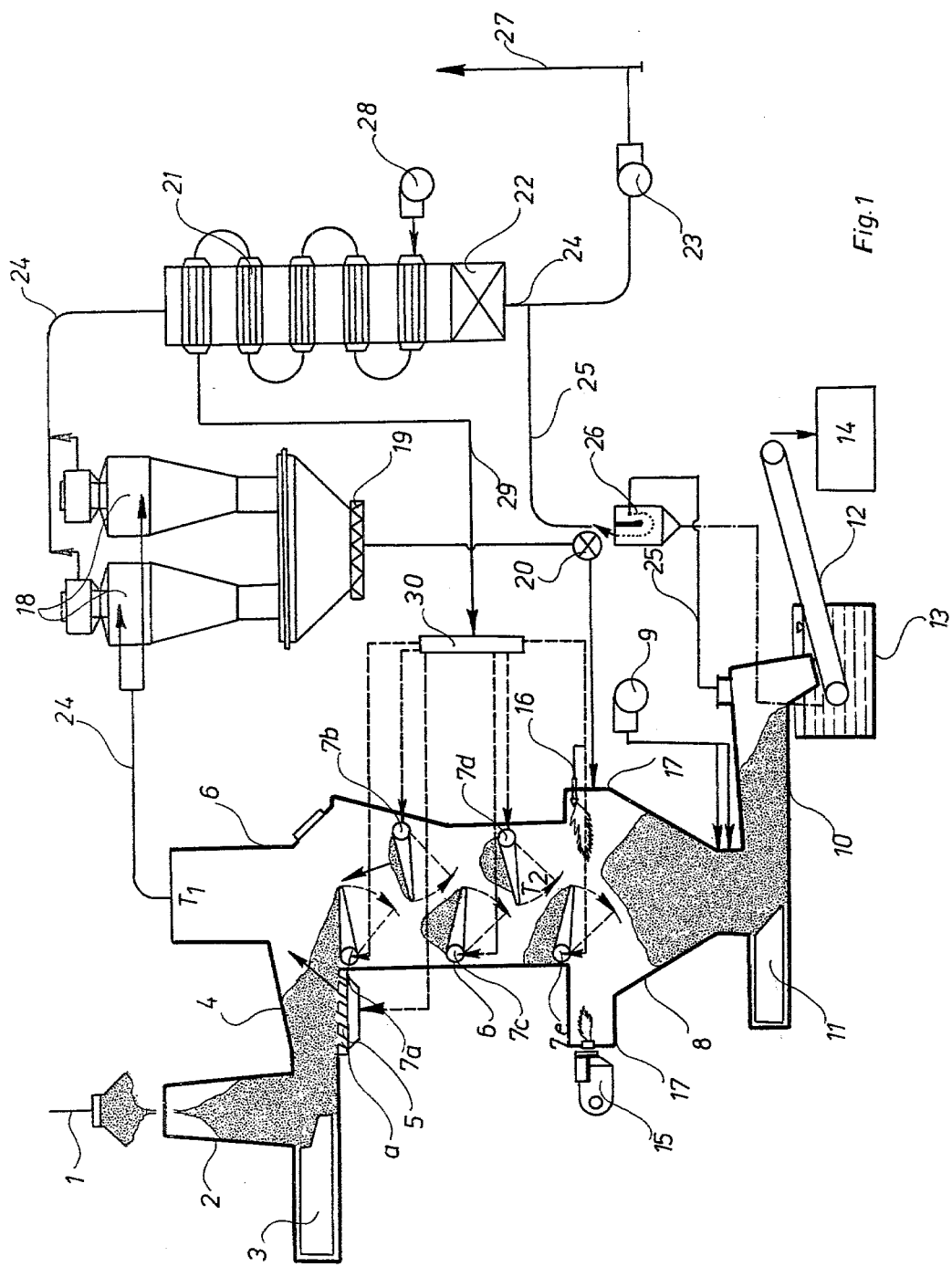
FIG. 1 is a schematic diagram of the plant according to the invention.
Figure 2:
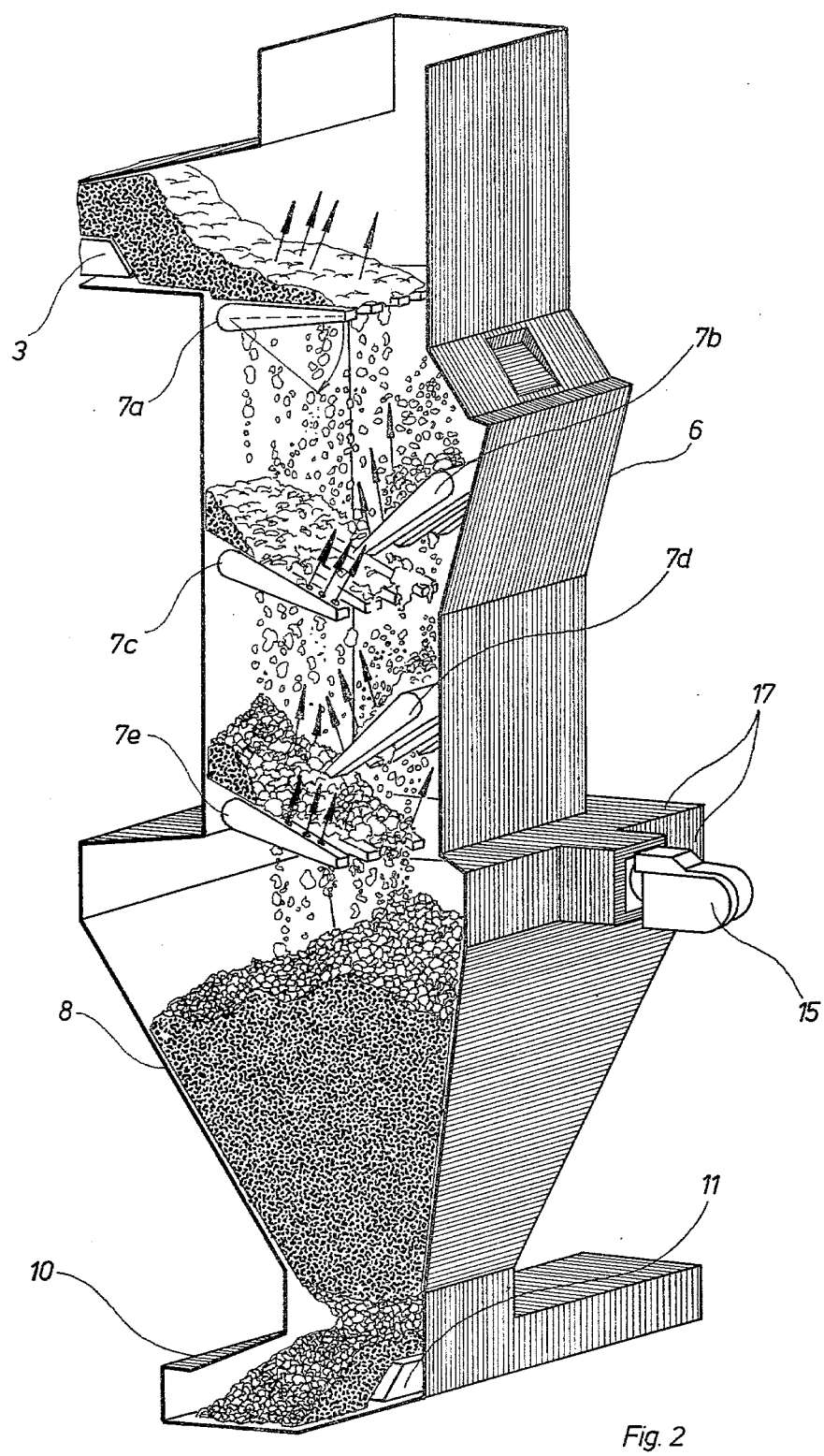
FIG. 2 is a perspective longitudinal section of the incinerating furnace.
Figure 3:
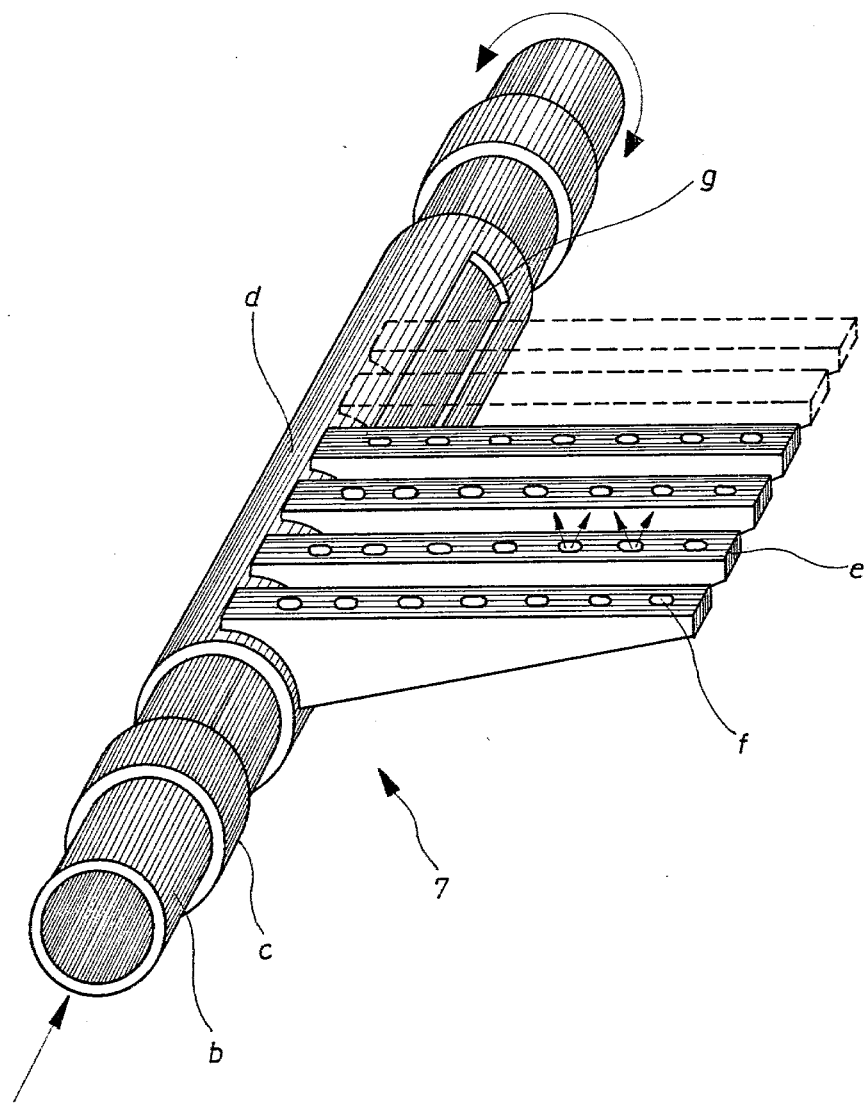
FIG. 3 is a perspective view of a tilting element of the incinerating furnace.

The plant, according to the invention, consists of a waste input feed system which comprises a travelling crane 1 with grab bucket, a loading hopper 2 and a hydraulic pusher 3, that is automatically operated and that feeds the waste material to a drying chamber 4 that includes a tube plate 5 fitted into a fireproof wall (not shown), the said tube plate 5 being provided with inclined conduits a through which hot air is injected in the bed of waste material.

The drying chamber 4 is connected to the incinerating furnace 6 which is provided with vertically tilting elements 7.

Each of these tilting elements has its own technological function in the incinerating process. The following notation is used for them in the drawings: 7a upper left, 7b upper right, 7c middle left, 7d lower right and 7e lower left.

The tilting elements 7 are automatically actuated by means geared motors (not shown). Each of the tilting elements consists of the following parts: a rotating tube b permanently supplied with hot air, bearings and packings c placed at the both ends of the tube b located in the incinerating furnace 6, and a tilting member d rigidly mounted on the rotating tube b provided with some hollow arms e which have orifices f along their upper surfaces.

Hot air is injected through the orifices f, as it comes through the hollow arms e, and through a longitudinal slot g in the tilting member and in the rotating tube b, which is permanently supplied with hot air.

At the lower part of the incinerating furnace 6, there is an ash hopper 8, in which the ash remains for a predetermined number of hours, until it is cooled by injecting cool air at the bottom of the ash hopper via a high pressure blower 9. The ash is discharged, from time to time, from the ash hopper 8 into a sealing discharge passage 10 by means of a hydraulic pusher 11 that is automatically actuated. From the discharge passage 10, the ash is discharged into a scraper flight conveyor 12 whose lower part lies in a water bath 13. The scraper flight conveyer 12 feeds up a section 14 where iron is extracted and compacted, and the ash is turned into construction elements.

The incinerating furnace 6 is provided with a starting burner 15 and an intervention burner 16, both of which are automatically actuated and placed on the linking transom 17 located between the incinerating furnace 6 and the ash hopper 8. The intervention burner 16 operates with hot air and a low fuel rate.

The plant includes also a set 18 of centrifugal gas separators, which has a Archimedean screw conveyer 19 mounted at its lower part in order to collect the light ash separated from the combustion gases in the centrifugal gas separators. Through a rotative arrester 20, the light ash is discharged into the ash hopper 8 after passing through the linking transom 17. The centrifugal gas separators 18 allow the recovery of the heat contained in the combustion gases by passing the scrubbed combustion gases through a superheater 21 for the air used to dry and burn the waste, and into a heat exchanger 22 used for producing a heat carrier for urban heating.

The ash hopper 8, the incinerating furnace 6, the centrifugal gas separators 18 the superheater 21 and the heat exchanger 22 are all placed under the suction produced by means of a gas exhauster 23 which is used, at the same time, for sucking up the steam emanated by the ash when, after passing through the sealing discharge passage 10, it is discharged into the water bath 13 of the scraper flight conveyer 12.

The structural elements 6, 18, 21, 22 on one hand, and the elements 10 and 13 on the other hand, are connected to the gas exhauster 23 by means of gas flues 24 and of steam flues 25, respectively.

The steam flues 25 include also a slime separator 26, which cleanses the aspirated steam and discharges the slime back into the scraper flight conveyor 12. The gas exhauster 23 discharges out the aspirated gases, through a stack 27.

Drying and combustion air at a high temperature is obtained by means of the air superheater 21. This combustion air is forced by means of a high pressure blower 28, through air flues 29, into an air distributor 30 which simultaneously feeds air to the tube plate 5, the tilting elements 7 of the incinerating furnace 6, and the intervention burner 16.

The operation of the plant according to the present invention, takes place as follows:

The incinerating furnace 6 is heated by actuating the starting burner 15. The waste is not yet introduced into the incineration furnace 6.

At the same time, the high pressure blower 28 is started. Thus, at the same time with the rise of the temperature of the combustion gases leaving the incinerating furnace 6, the combustion air is heated gradually as it uses the heat exchange that takes place in the air superheater 21. When the temperature of the combustion air has reached the minimal value of 250° C., the starting burner 15 is automatically shut down but the temperature continues to rise due to the intervention burner 16, which can operate when the temperature of the air rises over 250° C., and due to the sequential operation of pushing in the waste.

The waste material is taken up from a waste input feed arrangement (not shown) by means of the travelling crane 1 with its grab bucket which feeds the loading hopper 2. The hydraulic pusher 3, automatically operated, takes sequentially portions of material from the loading hopper 2, and pushes them into the drying chamber 4. The hot air is forced, through the inclined conduits a of the tube plate 5, into the bed of waste material in the drying chamber 4, in the direction indicated by the arrow, thus heating the waste in order to dry it.

The waste material remains in the drying chamber 4 an interval which corresponds to the periods of time between two successive feeding operations. Thus, when leaving the drying chamber 4, the waste has already lost the greatest amount of its surface moisture. From the drying chamber 4, the waste is pushed down into the incinerating furnace 6, on its first tilting element 7a left where it remains a predetermined interval of time, coming into contact both with the hot air forced through the orifices f of the tilting element, and with the combustion gases which rise upward in the incinerating furnace 6. These gases, emanated during the incineration of the waste on the lower tilting elements, cleans the bed of waste placed on the tilting element 7a left, and are introduced through its arms e. In such a way, the waste is completely dried up under the combined effect of these agents and of the heat radiated from the lower tiliting elements during the incineration process. As the temperatures of the incineration process continue to rise, a part of the combustible waste is incinerated, while another part of the waste on the tilting element 7a is entrained into a calcination process. This process is continued on the tilting element 7b right, too, where the waste falls automatically from the tilting element 7a left, at a certain moment, due to the movement transmitted to it by the group of geared motors.

The calcined waste falls in the same way from the tilting element 7b right on the tilting element 7c left, where it quickly reaches the temperature of combustion under the effect of the same agents, and is entrained in the incineration process by means of the hot air. The combustion process continues on the tilting element 7d right, too, it being completely achieved on the tilting element 7e left. The heat, radiated during the processes that take place on these lower tilting elements (7d and 7e), plays a very important role as it is used in order to achieve the drying, the calcination and the gasification processes on the upper tilting elements.

The ash and the slag are discharged from the tilting element 7e left into the ash hopper 8, which always has at its upper part a fire bed with continuous heat radiation. In such a way, the combustion process continues even when the lower tilting elements do not participate in the process due to the movements they perform during the loading and the unloading operations.

The combustion process which takes place in the upper part of the ash hopper 8, continues due to the material brought here by the set 18 of centrifugal gas separators, by means of the Archimedean screw conveyer 19 and of the rotative arrester 20. This material consists of the ash and the yet unburned particulate matter entrained by the combustion gases from the incinerating furnace 6 and separated in the set 18 of centrifugal gas separators.

This material is almost dried up on its way from the furnace to the set 18 of centrifugal gas separators. Thus, it is quickly entrained in the combustion process with the air blasted, by means of the high pressure blower 9, at the bottom of the ash hopper. This air flow is heated as it passes through the bed of ash and hot slag, thus recovering a great amount of the waste heat it contains. As soon as the incinerating furnace is heated, and the level of the ash in the ash hopper 8 raises, the temperature of the combustion air reaching a value that is over 450° C. (two factors which condition each other), the incineration process goes on the basis of a self-combustion operation.

In such a way, the need of liquid fuel supply is eliminated, and the incinerating process evolves only due to the recirculation of a quantity of the heat that is generated in the incinerating furnace itself, and to the utilization of the waste heat recovered from the ash and the slag by means of the cool air introduced at the base of the ash hopper 8. Thus, the temperature of combustion is held over 800° C. and the flow rate of the waste material is maintained constant.

The tilting elements 7 of the incinerating furnace 6 are actuated according to a predetermined program, a movement correlated with the above mentioned mode of operating the plant.

As soon as the starting burner 15 is put out of action and the intervention burner 16 is started up, the tilting elements 7 of the incinerating furnace 6, which are all placed in the horizontal position, are actuated according to the mentioned predetermined program, a program that includes two cycles.

In the first cycle, the tilting element 7e left is tipped downright at a 90° angle, and quickly comes back to the initial positon; as soon as it reaches the initial, horizontal position, it makes, by its motion, the tilting element 7d right to tip down at a right angle.

According to the same mode of operation, the tilting elements 7 are entrained into motion one after another, the return movement of one element determining the tipping motion of the following elements (7c left and 7b right). When the upmost tilting element 7a left comes to the initial horizontal position, the hydraulic pusher 3 is put into operation and performs two to-and-fro movements in order to discharge an amount of waste from the drying chamber 4 on the tilting element 7a left.

In the second cycle, which starts after the tilting element 7a left was charged with waste, the tilting elements 7 perform automatically the same regular movement, but this time it is 7d right the tilting element which moves first.

When the movement is finally transmitted to the tilting element 7a left, the waste material, which was introduced during the first cycle, has already been discharged on the tilting element 7b right, and the element 7a receives other charge of waste due to other succesive movements performed by the hydraulic pusher 3. In such a way, the two cycles alternates, and all the tilting elements are charged with waste material which starts to burn under the effect of combustion agents (combustion air and gases).

By each tipping movement of the tilting element 7e left, the ash is discharged in the ash hopper 8. When the level of ash attains a maximum, the hydraulic pusher 11 is automatically put into operation according to a predetermined program for discharging the ash. The hydraulic pusher 11 draws ash and slag charges out of the lower part of the ash hopper 8, and pushes them into the discharge passage 10, a passage that is also used for sealing the ash hopper 8.

The rotative arrester 20 introduces in the ash hopper 8 non-burned particulate matter which falls over the ash and slag charges discharged by the tilting element 7e left. This light particulate matter was entrained by the combustion gases, products of incineration, and separated by them in the set 18 of centrifugal gas separators. This nonburned particulate matter undergoes combustion under the effect of the hot ash discharged by the tilting element 7e left and of the air forced by the blower 9 at the base of the ash hopper 8.

The predetermined program, according to which the tilting elements are automatically actuated, and the cycles for actuating the hydraulic pushers are carried out by means of selectors, stroke limiters, geared motors and hydraulic elements, all of them known and not shown.

The predetermined program, according to which the combustion process is turned into a self-combustion process, differs from the other predetermined program used during the self-combustion process only by the fact that it includes a circuit element to influence the transit time between the first cycle and the second cycle. This element ensures at the same time with the rise of the temperatures in the incinerating furnace, the increasing of the flow rate of the waste material by reducing the transit time between the two cycles.

As a rule, the combustion temperature is taken at two different points of the incinerating furnace: $T_1$ is the temperature of the combustion gases which leaves the incinerating furnace, and $T_2$ is the temperature in the lower part of the incinerating furnace. The temperature $T_1$ conditions the self-combustion process by the fact that its value should be maintained within certain range as to ensure the necessary enthalpy of the combustion air.

The temperature $T_2$ indicates the quality of the combustion process, its value should also be held within a certain range as to ensure a complete combustion and to avoid reaching the ash-fusion temperature point. At the time of turning the combustion process into a self-combustion process, the temperature $T_2$ is held within a certain range (800°–950°, for example), while the temperature $T_1$ continues to rise up till it attains the limits of $T_2$. When $T_1$ equals $T_2$, the combustion process is turned into a self-combustion process, the temperature $T_1$ ensuring the overheating of the drying and combustion air above 400° C.

The temperature $T_1$, being in fact equal to $T_2$, was chosen to be a control element in the automatization of the process because, as soon as its value is not maintained within the established range, the flow rate of the waste material to feed the furnace is momentary modified. Thus, if the temperature $T_1$ tends to rise over 950° C., the feeding of the furnace is automatically interrupted for the phase that is underway; vice-versa, if the temperature $T_1$ tends to lower below 750° C., the flow rate of waste material is automatically increased, the furnace is fed up with additional waste material, and the intervention burner 16 is started up.

The burner 16 is automatically put out of action when the temperature attains the value of 950° C.

The ash and the slag is sequentially pushed from the discharge passage 10 into the water bath 13 in order to be cooled. The ash is taken by the scraper flight conveyer 12 and undergoes a dehydration process as it is conveyed by this device.

The scraper flight conveyor 12 discharges the slag into the section 14 where iron is extracted and compacted, and the ash is turned into construction elements. As an instant evaporation, which entrains dust, happens in the place where the ash is discharged from the passage 10 into the water bath 13, this place is put under the depression produced by means of the exhauster 23. The steam with dust is passed through the slime separator 26 in such a way as to prevent the wet dust to deposit in the stream flues 25 and in the exhauster 23. The slime, separated from the steam with dust, is introduced again into the water bath 13, wherefrom it is taken by the scraper flight conveyor 12. The gases, products of incineration, are passed through the set 18 of centrifugal gas separators where they are mechanically scrubbed out. The resulted dust is collected by means of the Achimedean screw conveyor 19 and discharged through the rotative arrester 20 into the ash hopper 8. The scrubbed gases are then forced, through the gas flues 24, into the air superheater 21, when a quantity of their thermal energy is transferred to the air used for drying and combustion, air injected by means of the high pressure blower 28 through the air flues 29 into an air distributor 30, which simultaneously feeds up with air the tube plate 5, the tilting elements 7 of the incinerating furnace and the intervention burner 16. The combustion gases leave the air superheater 21, and are forced into the heat exchanger 22 used for producing heat carrier for urban heating. These gases are finally sucked up by the gas exhauster 23 and exhausted to the atmosphere through the exhaust stack 27.

Thus the process for incinerating residential waste according to the invention is characterized by the fact that residential waste with a low calorific value and a high water content can be incinerated and the ash produced in the incineration process is used as a raw material for pressed construction materials. The process consists of the following three phases:

In the first phase, an incinerating furnace, that is vertical and static, is heated by means of an automatic burner with liquid fuel until the temperature of the gases which leave the furnace is on the order of 450°–500° C., and the temperature of the combustion air is within the range of 200°–250° C., air which is heated in an air superheater with the heat recovered from the combustion gases mechanically scrubbed in a set of centrifugal gas separators;

In the second phase, the plant is put under the thermal condition by means of an automatic intervention burner with a low flow rate of liquid full and by sequentially pushing in charges of waste, thus obtaining the rise of temperature of the combustion gases from 500°–950° C., and of the temperature of the combustion air from 250°–450° C. (temperatures which condition each other); during this phase the tilting elements perform tipping movements according to a predetermined program, a program that includes two cycles which succeed each other, the first cycle starting from the lower tilting elements to the upper tilting elements, the transit time between the two cycles shortens as the temperatures rise up, for example from 3.5 minutes to 2.0 minutes, the transit time being, in fact, the element which causes the gradual rise of the input feed flow rate of waste material at the same time with the rise of temperatures, thus ensuring the condition for the process to enter.

In the third phase, when the incineration process is based on a self-combustion operation which ensures the range of temperature of the combustion gases to be on the order of 800° and 950° C., and that of the combustion air over 400° C., an overheated air which is forced both into the lower part of a drying chamber placed before the incinerating furnace, and into all the tilting elements of the furnace, finally coming out of the bed of waste with the required speed, while the ash produced in the incineration process is cooled by injecting cool air at the lower part of a hopper which collects both the ash discharged from the furnace and the ash particles and the non-burned particulate matter entrained by the combustion gases out from the incinerating furnace and separated into the set of centrifugal gas separators placed between the incinerating furnace and the air superheater, and, as the combustion of this non-burned particulate matter takes place in this ash hopper, the content of residual carbon in the ash is below 1%, thus creating the possibility to turn to good use the ash produced in the incineration process. The self-combustion of the waste material with a low calorific value of about 500 kcal/kgf keeps going on due to the compensation of this low calorific value, compensation which is obtained by ensuring the necessary enthalpy for the incineration process both by forcing the combustion air with a temperature over 400° C. and by introducing cool air at the lower part of the ash hopper, air which cools the ash and takes over an additional quantity of heat; the air, which is used for the combustion and the drying processes, is heated in an air superheater, and then, together with the heat emanated during the incineration of the waste on the lower tilting elements and with the heat contained in the ascending combustion gases gases which are the products of the incineration of the waste on the lowest three tilting elements, it is used in the dehydration process for taking over a quantity of the water content of the waste material placed in the drying chamber, in such a way that the incineration process evolves under the effect of both the combustion air and the air heated in the ash hopper, the waste material being successively tipped down on the tilting elements, thus ensuring other surfaces for the combustion process and for the transfer of heat at the lower part of the furnace.

The present invention has the following advantages:

It allows the incineration of residential waste with a low calorific value and a high water content;

It allows a constant flow rate of incinerating waste and a high temperature range to be maintained during the self-combustion, a process which is based on the compensation of the low calorific value of the waste by introducing into the incinerating furnace additional thermal energy, energy which is obtained both by overheating the air used for the incinerating and the drying processes with the heat recovered from the gaseous products of incineration, and by utilizing almost all the energy recovered from the ash and the slag resulted from incineration;

It allows the realization of an intricate mixture between the combustion air and the waste material, due to the combustion technology used in the process of incineration, thus obtaining high combustion temperatures which lead to a very low content of residual carbon (below 1%) in the ash produced in the incineration process, from here resulting the possibility to turn to good account the ash.

We claim:

1. A method of incinerating residential waste material which comprises the steps of:

(a) initially heating a vertical furnace with a liquid-fuel burner to produce combustion gases at a temperature at an outlet from said furnace of substantially 450° to 500° C.;

(b) preheating combustion air with exhaust gase from said furnace to a temperature of 200° and 250° C. and admitting said combustion air to said furnace at least in part through hollow tilting elements vertically staggered in said furnace;

(c) simultaneously with step (b) passing quantities of waste material downwardly through said furnace on said tilting elements and burning the waste material with said combustion air and concurrently firing said furnace by a second burner with liquid fuel supplied at a lower rate than in the first mentioned burner, said first burner being cut off, thereby raising the temperature of exhaust gas from said furnace to 800° to 950° C. and the temperature of the combustion air preheated by the exhaust gas to a temperature of about 400° to 450° C.;

(d) extinguishing said second burner and continuing the feed of waste material and combustion air to said furnace to maintain the last mentioned temperature autogenous combustion of the waste material;

(e) collecting ash below said tilting elements in said furnace; and (f) cooling said ash with air and permitting the air used to cool the ash to rise in said furnace.

2. An apparatus for the incineration of residential waste, comprising:

a vertical furnace having:
 a waste material inlet at an upper end,
 an ash-collecting chamber at the bottom of said furnace, and
 a combustion chamber between said inlet and the ash-collecting chamber;

means for feeding residential refuse as waste material to said inlet;
 means for preheating combustion air by indirect heat exchange with exhaust gases emerging from said furnace;

a plurality of vertically staggered tilting elements mounted in said combustion chamber, each of said tilting elements having a plurality of hollow arms provided with orifices for the combustion air along upper surfaces of the arms;

means for feeding preheated combustion air to said arms;

a starting burner opening into said furnace between said chambers for initially generating exhaust gas therein for preheating combustion air; and a sustaining burner opening into said furnace between said chambers for augmenting the temperature of the combustion air.

3. The apparatus defined in claim 2 wherein each of said tilting elements comprises a rotatable tube communicating with a source of preheated combustion air, and a pivotal member formed with the respective arms and mounted on said tube, said tube having a longitudinal slot communicating with the respective arms.

4. The apparatus defined in claim 3 further comprising cyclone separators for removing dust from the exhaust gas from said furnace prior to passing same into heat exchange with the combustion air, a discharge passage from said ash chamber opening into a water bath, and a slime separator communicating with said discharge passage.

* * * * *